May 17, 1955  M. E. BIGELOW  2,708,327
SPRING JAW ANIMAL TRAP
Filed Oct. 14, 1952

INVENTOR
Merle E. Bigelow
BY
ATTORNEY

United States Patent Office 2,708,327
Patented May 17, 1955

2,708,327

SPRING JAW ANIMAL TRAP

Merle E. Bigelow, Marysville, Ohio

Application October 14, 1952, Serial No. 314,636

6 Claims. (Cl. 43—88)

This invention relates to animal traps, having particular reference to traps of the type having jaw members pivotally mounted for turning movement toward and away from each other, and wherein a coiled torsion spring is provided for imparting such relative turning movement to the jaw members following their release by an associated latching or trigger mechanism.

Among others, the principal objects of the present invention are: to provide an animal trap of the type set forth having an improved pivotal mounting for the spring-actuated turnable jaws thereof, the mounting being such that when the jaws are trigger-released the same turn upwardly toward each other with uniform movement, or, in the event one of the jaws should be restrained against such movement, the other or free jaw will turn about said mounting until attaining animal-trapping engagement with the motion-restrained jaw; to provide a trap of this kind having an improved spring action for controlling the closing movement of the jaws, and wherein the spring action is such that as the jaws turn toward their positions of closure, the spring action becomes increasingly effective in bringing the associated trap jaws into animal-clamping engagement; to provide a spring trap of the character indicated in which the jaws are of duplicative design and may be used interchangeably in the trap; to provide an improved spring mechanism for such traps wherein a coil spring of the torsion type is adjustably mounted on a jaw-carried shaft, and wherein one end of the spring is extended perpendicularly with respect to the shaft and engaged at its outer end with a hook element formed on the outer end of a slotted lever plate turnable about the axis of the shaft, there being a stud provided on the jaw member opposite to that carrying the spring shaft, with the stud and spring shaft spaced equidistantly with respect to the axis of pivotal union and turning movement of said jaws, the stud being receivable in an elongated slot formed in the lever plate, whereby when associated trigger mechanism is actuated to release the jaws, the force of the spring, applied through the perpendicular extension thereof, will be exerted equally on both jaws to produce turning movement thereof in unison, or if one jaw should be restrained against such movement to provide for increased turning movement of the free or unrestrained jaw toward the restrained jaw; to provide a trap of this kind having an improved jaw-latching and releasing trigger mechanism; and to provide a trap which constitutes an improvement generally on traps of this kind as hitherto produced by the prior art.

For a further and more complete understanding of the invention, reference is to be had to the following description and the accompanying drawings, wherein.

Figure 1:
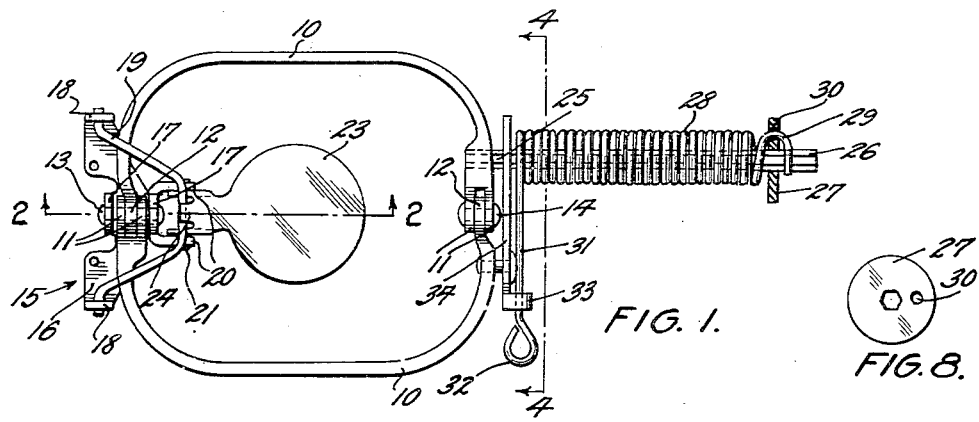
Fig. 1 is a top plan view of an animal trap constructed in accordance with the present invention.
Figure 8:
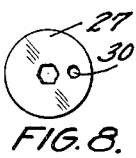
Fig. 8 is a plan view of the adjustable spring-anchoring disk.
Figures 2, 3:
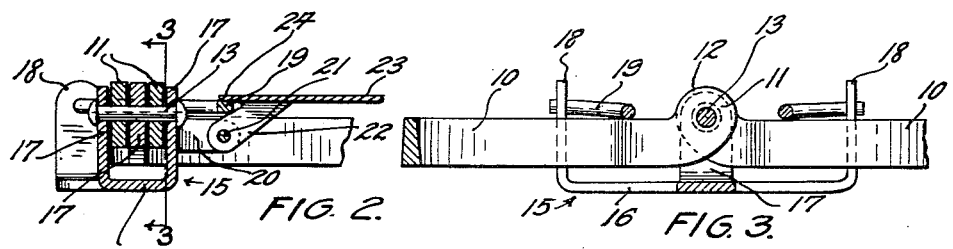
Fig. 2 is a detail vertical longitudinal sectional view taken through the trigger mechanism of the trap on the plane indicated by the line 2—2 of Fig. 1.
Fig. 3 is a vertical transverse sectional view taken through the trap on the plane indicated by the line 3—3 of Fig. 2.

Referring more particularly to the drawings, it will be seen that the trap of the present invention makes use of a pair of arcuate jaws, such as those indicated at 10. These jaws are each of semi-circular or semi-elliptical configuration when viewed in plan, as in Fig. 1. Further, the jaw members are of duplicative construction adapted to be used interchangeably, and do not involve separate inner and outer members requiring the use of a pair of parts, as is customary in traps of this kind. One end of each of the jaw members is turned upwardly and bifurcated to provide a pair of apertured ears, indicated at 11, while the other end of each of said jaw members is formed with a single upturned ear, as indicated at 12, the latter being received between the bifurcated ears of a complemental jaw member. Long and short pivot pins 13 and 14, respectively, pass through the apertures of the ears 11 and 12 and are disposed in longitudinally aligned relationship in such a manner as to provide an axis about which the jaw members may turn between their opened and closed positions.

Figures 6, 7:
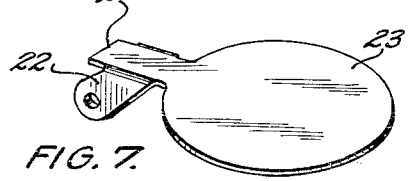
Fig. 6 is a detail perspective view of the base bracket of the trap, as provided in connection with the trigger mechanism thereof.
Fig. 7 is a detail perspective view disclosing the tripping and latching plate of the trigger mechanism.

The longer pin, shown at 13, is arranged on the trigger side of the trap and is employed to unite with the apertured ears 11 and 12 at the left, or trigger side, of the trap with a base bracket 15. As shown in Fig. 6, this base bracket comprises, preferably, a metal stamping, having a base portion 16 formed intermediately of its length with a pair of marginally disposed upturned tongues 17, the latter having their upper ends apertured to receive the ends of the pin 13. Also, the base plate at its opposite ends is formed with upturned integral legs 18, which have their upper ends apertured to receive the outturned fulcrumed ends of a trigger bail 19. One of the tongues 17 is formed in this instance with a pair of relatively spaced, horizontally aligned inwardly projecting arms 20, which have their outer ends apertured to receive a cross pin 21 employed in pivotally uniting with the base bracket a pair of downwardly and angularly extending lugs 22 projecting from the lower surface of a trigger plate 23.

It will be observed that in order to set the trigger mechanism in position to hold the jaws open against spring tension, as hereinafter explained, the bail is rocked until it assumes a position in a substantially horizontal plane, wherein the side legs of the bail engage the upper edges of each of the jaw members equidistantly and on opposite sides of the longitudinal pivot provided by the longer pin 13. The bail is retained in this position, holding the jaws open, by moving the trigger plate 23 until the rear lip-forming end 24 of said plate is positioned to overhang the central web of the bail, in which the web is held against the under surface of the lip 24. Spring force applied to the jaws, and tending to turn the latter upwardly around the axis of the pin 13, is thus restrained, since the force of the jaws is exerted against the bail 19 and the latter, in turn, is held against movement by its engagement with the trigger lip 24. However, to release the jaws an animal contacting the plate 23, and on which bait may be deposited, will produce rocking action of the plate of an extent sufficient to cause the lip 24 to be separated from engagement with the central web of the bail 19, thus allowing the bail to turn about its fulcrum mounting on the legs 18 of the base bracket, moving to an out-of-the-way position and enabling the jaw members to swing sharply under spring action to their positions of closure. A simple, positive and effective trigger mechanism is thus provided in my improved trap.

The spring mechanism employed by the present invention for supplying energy to the jaws to effect their rapid closure when the trigger mechanism is released, comprises a spring-carrying shaft 25. This shaft has its inner end connected with one of the jaws 10 in spaced relation from the pivotal axis of the jaws as provided by the pivot pin 14. The shaft extends outwardly and longitudinally from the jaw with which it is joined in parallel relation to the axis of turning movement of the jaws 10. The outer end of the shaft terminates in a polygonal or multi-surfaced end 26, and on which is removably mounted a spring adjusting and fastening washer 27, the latter having a central bore corresponding in configuration to the multi-surfaced end 26 of the shaft 25, so that the washer may be held against rotation on the shaft when positioned thereon, but may be readily slipped off one end of the shaft and partially rotated to vary the tension of an associated coil spring 28. Said spring in this instnce has one end thereof bent as at 29 and extended through an opening 30 formed in the washer 27.

The opposite end of the spring 28 is formed with a laterally directed extension 31 projecting perpendicularly from the axis of the shaft 25. The extreme outer end of the extension 31 is engaged with a hook 33 formed on the outer end of a jaw-turning lever arm or plate 34. The inner end of this arm or plate is formed with an opening through which the shaft 25 passes. Also, formed in the plate is an angularly extending elongated guide or slot 35, the latter having one end thereof inwardly curved as at 36 toward the shaft 25. Positioned in the slot 36 is a stud 37 which is carried by and projects laterally and stationarily from the jaw 10 opposite to that carrying the shaft 25, the stud 37 being spaced equidistantly from the axis of the pivot pin 14 as is the shaft 25.

In the operation of the spring mechanism, it will be seen that following release of the trap jaws, through actuation of the trigger mechanism, movement will be imparted to the plate 34 by the force of the spring 28 exerted through its extension 31 on the hook 33 provided at the outer end of the plate. This force is exerted equally on both jaws, causing the same normally to turn in a trap-closing direction in relatively uniform degree. Such jaw-turning movement is accomplished by the fact that the outer end 29 of the spring is connected with the shaft 26 through the washer 30, while the opposite end 31 of said spring exerts its force on the opposite jaw by reason of the slot construction 35 provided in the lever plate 34 and the jaw-carried stud 37 operating in said slot. If unrestrained, the jaws will move from the open position thereof as disclosed in Fig. 4, in which said jaws are horizontally disposed, to the closed position disclosed in Fig. 5, wherein the jaws are disposed in substantially parallel vertical order. If movement of one of the jaws, however, should be restrained, as by the weight of an animal thereon, the other of the jaws will continue to move freely toward the restrained jaw until positive movement thereof is arrested, as by the engagement of the movable jaw with a trapped animal. As the stud 37 moves toward the bottom of the slot 35 the leverage forces exerted on the jaws by the spring proportionally increased, so that when the jaws are in contact with a trapped animal the maximum force of the spring is being utilized, preventing the struggles of a trapped animal from separating the jaws. Such separation is further precluded by the curved end 36 of the slot which, of itself, tends to lock the jaws against separation. The hook 33 on the plate 34 enables the spring extension 31 to be readily connected or disconnected with the plate 34 in effecting adjustments of the trap, or in setting the same for actuation.

Figure 4:
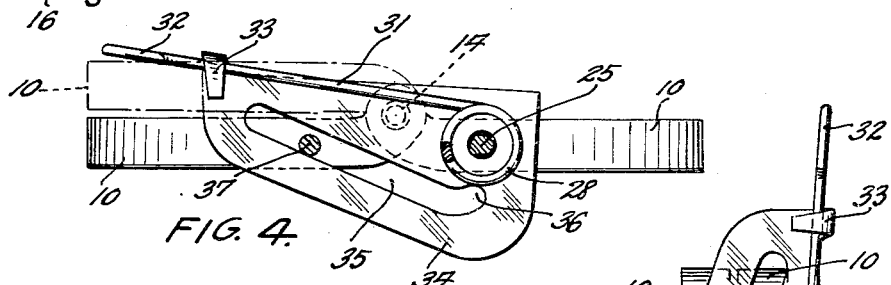
Fig. 4 is a similar view disclosing the spring-actuated mechanism of the trap, the plane of the figure being indicated by the line 4—4 of Fig. 1 and looking in the direction shown by the arrows, the jaws of the trap being shown in their trigger-latched positions.
Figure 5:
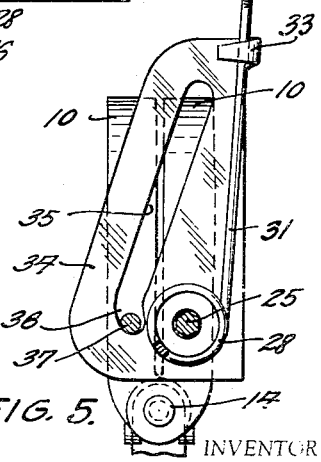
Fig. 5 is a view similar to Fig. 4, but showing the trap with the jaws thereof in their closed or trigger-released positions.

It will thus be seen that I have provided a simple, positive and effective animal trap, and, also, one which may be manufactured and sold at a comparatively low cost. When the jaws of the trap are released by an animal displacing the trigger plate 23, each of the jaws 10 swing under spring tension through approximately 90 degree arcs from their open positions as shown in Fig. 4 to the closed positions disclosed in Fig. 5. During movement of the jaws from their open to their closed positions, the stud 37 slides within the slot 35 of the lever plate 34, so that as spring pressure decreases upon closure of the trap, the leverage acting upon the jaws is conversely increased, a feature which greatly increases the efficiency of the trap in preventing the escape of animals which have once been caught between the jaws.

While a single preferred form of the present invention is disclosed in detail, it will be understood that various modifications may be resorted to without departing from the sphere of the invention or the scope of the following claims.

I claim:

1. An animal trap comprising: a pair of arcuate jaws; means pivotally uniting the adjacent ends of said jaws to provide for turning movement thereof about a common longitudinal axis, a shaft fixed to one of said jaws and extending beyond the same in parallel and offset relation to said axis; spring means for moving said jaws into animal-trapping engagement, said spring means embodying a coil spring surrounding said shaft; means for attaching one end of said spring to said shaft; a lever plate mounted on said shaft and turnable about the axis thereof; means uniting the end of said spring opposite to that connected with said shaft to the outer part of said lever plate, said plate being formed with an elongated guide therein; a stud element carried by the jaw opposite to that from which said shaft extends, said stud element having sliding engagement with said plate guide; and an animal actuated trigger mechanism engageable with said jaws in such a manner that the release of said trigger mechanism serves to cause said spring means to move said jaws about said axis toward positions of closure.

2. An animal trap comprising a pair of jaws having contiguous ends, means pivotally uniting said ends to provide for relative turning movement of the jaws about a common pivotal axis, a rigid shaft member fixed to one of said jaws and extending longitudinally and outwardly therefrom in parallel and laterally offset relation to said axis, a coil spring surrounding said shaft, said spring being formed at its inner end with a laterally directed extension, a plate having an inner end region mounted for rotation about the axis of said shaft member and an outer portion connected with the outer end of said spring extension, said plate being formed with an elongated guide therein, a pin carried by the jaw of the trap opposed to that on which the spring and shaft member are carried, said pin being slidable within the guide of said plate, means carried by the shaft member at its outer end to which the outer end of said spring is anchored, and a trigger mechanism engageable with the jaws to maintain said jaws in relatively spaced and opened positions against the closing forces exercised thereon by said spring when said trigger mechanism occupies a set position.

3. An animal trap as defined in claim 2, and wherein the means carried by the outer end of said shaft member for anchoring the outer end of said spring are adjustable about the axis of said shaft member to control the tension of the spring.

4. An animal trap as defined in claim 2 and wherein the plate mounted for rotation about the shaft member axis has an outer end formed to include a hook with which the outer end of the spring extension is removably engaged.

5. An animal trap as defined in claim 2, and wherein the outer end of said shaft member is of polygonal form, and said last-named means comprises a disk having a polygonal opening formed therein for slidable and removable reception on the outer end of said shaft member.

6. An animal trap as defined in claim 2, wherein the guide of said plate terminates in a laterally offset extension contiguous to the inner end region of said plate.

References Cited in the file of this patent

UNITED STATES PATENTS

| | | |
|---|---|---|
| 211,266 | Schroder | Jan. 7, 1879 |
| 1,279,782 | Stephens | Sept. 24, 1918 |
| 1,585,568 | Soule | May 18, 1926 |
| 1,612,608 | Chamberlin | Dec. 28, 1926 |

FOREIGN PATENTS

| | | |
|---|---|---|
| 567,416 | France | Mar. 1, 1924 |